No. 866,000. PATENTED SEPT. 17, 1907.
J. A. CUMMING.
SELF LOCKING MOWING MACHINE GUARD.
APPLICATION FILED SEPT. 8, 1906.

WITNESSES
Wm. A. Wyman.

INVENTOR
J. A. CUMMING
BY
ATT'Y.

UNITED STATES PATENT OFFICE.

JOHN A. CUMMING, OF MONKLAND STATION, ONTARIO, CANADA.

SELF-LOCKING MOWING-MACHINE GUARD.

No. 866,000.          Specification of Letters Patent.          Patented Sept. 17, 1907.

Application filed September 8, 1906. Serial No. 333,843.

*To all whom it may concern:*

Be it known that I, JOHN A. CUMMING, of Monkland Station, in the county of Stormont, Province of Ontario, Canada, have invented certain new and useful Improvements in Self-Locking Mowing-Machine Guards, of which the following is a specification.

My invention relates to improvements in mowing machine guards and the objects of my invention are to provide a self locking guard which may be readily attached to the finger bar of the mower without the use of bolts or nuts which are liable to become rusted and consequently difficult to remove when replacing a broken guard in the field or removing the guard for the purpose of sharpening one or more knife sections; and it consists essentially of a plurality of removable guards having tenons on the top thereof adapted to enter slots on the underside of the finger bar, spring-held dogs pivoted to the guard and provided with upturned ends which engage the rear of the finger bar and resilient means for holding said dogs in their engaged position, the various parts of the device being constructed and arranged in detail as hereinafter more particularly described.

Figure 1:
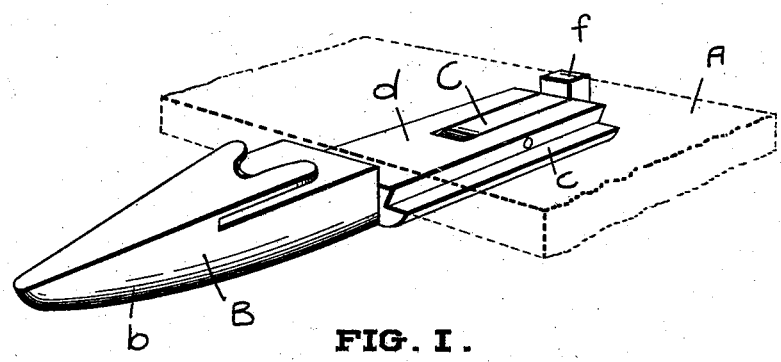
Figure 2:
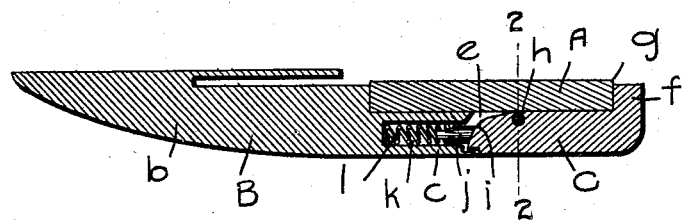
Figure 3:
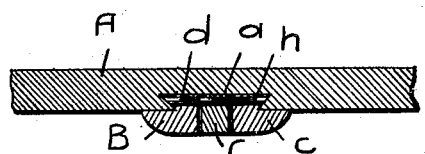

Figure 1 is a perspective view of my improved guard the finger bar being indicated in dotted lines. Fig. 2 is a sectional view through the finger bar and guard. Fig. 3 is a sectional view on the line 2—2 Fig. 2.

In the drawings like letters of reference indicate corresponding parts in each figure.

Referring to the drawings A represents a portion of the ordinary finger bar of a mowing or other harvesting machine. On the underside of this a plurality of transversely extending dove-tailed slots $a$ are provided as indicated.

B is one of the knife guards the front portion $b$ of which is of the usual construction and the rear portion $c$ of which has integral therewith and upwardly extending therefrom a tenon $d$ adapted to fit within the slot $a$. To lock the guard in position a spring-held dog C is located within a recess $e$ provided in the rear portion of the guard and pivoted by means of the pivot $h$ to the guard. This dog is made in the form indicated provided with an upturned end $f$ adapted when the dog is in its locked position to engage the rear side $g$ of the finger bar. The inner end of the dog is provided with a cam surface $i$ which is engaged by the end $j$ of a plunger which may reciprocate in the recess $k$. The plunger is spring-held in its outermost position by means of a compression spring $l$ and the end of the plunger is curved to conform to the cam surface $i$ whereby a depression of the end $f$ will force the plunger inwardly and cause the spring to act thereagainst tending to return the dog to its normal position.

It will thus be seen that by means of my invention each of the guards may be very easily placed in position and removed. To insert them it is only necessary to insert the tenon in the slot and push the guard rearwardly until the end of the spring-operated dog engages the opposite end of the finger bar. To displace them it is only necessary to move the end of the dog out of engagement with the finger bar and then withdraw the guard. These operations can very readily be performed in the field and thus a broken guard can be removed or access can be easily gained to the knives.

While I have described with great particularity of detail one specific embodiment of the invention yet it is not to be understood that the invention is limited thereto as certain changes might be made in the details thereof without materially departing from the spirit of my invention.

What I claim as my invention is:—

1. In a mowing machine guard the combination with a finger bar of a guard removably secured thereto and a dog for locking the same in position as and for the purpose specified.

2. In a mowing machine guard the combination with the finger bar of a guard removably secured thereto and a spring-operated dog locking the guard in position as and for the purpose specified.

3. In a mowing machine guard the combination with the finger bar having a transverse slot in the bottom thereof of a guard having a tenon thereon engaging said slot, a dog pivoted to the guard and adapted to engage the finger bar and means for normally holding the dog in its locked position as and for the purpose specified.

4. In a mowing machine guard the combination with the finger bar having a transverse slot in the bottom thereof, of a guard having a tenon thereon engaging the slot, of the dog pivoted to the guard, and having an upturned end engaging the rear of the finger bar and means for locking the dog in position as and for the purpose specified.

5. In a mowing machine guard the combination with the finger bar having the transverse slot in the bottom thereof of a guard having a tenon thereon engaging said slot, a dog located in a recess in the guard and pivoted thereto, an upturned end on the dog engaging the end of the finger bar and spring means for holding the dog in its engaged position as and for the purpose specified.

6. In a mowing machine guard the combination with the finger bar having a transverse slot in the bottom thereof of a guard provided with a tenon extending into said slot, a recess in the rear of the guard, a dog pivoted within said recess having an upturned end adapted to engage the inner side of the finger bar, a cam surface provided on the end of the dog extending within the slot, a plunger abutting said cam surface and reciprocating within the recess provided in the guard and a spring normally holding the plunger in contact with the cam surface as and for the purpose specified.

7. In a mowing machine guard the combination with the finger bar having a plurality of transverse dove-tailed slots of a plurality of guards fitting within the same and spring operated means for locking the guards in the slots as and for the purpose specified.

8. In a mowing machine the combination with the finger bar having a plurality of transversely extending dove-tailed slots of guards fitting within said slots and spring-held dogs pivoted to each guard and engaging the finger bar as and for the purpose specified.

Signed at Avonmore, in the Province of Ontario, this 31st day of August, 1906.

JOHN A. CUMMING.

Witnesses:
 LORNE BETHUNE,
 OSCAR FULTON.